(12) United States Patent
Harvell

(10) Patent No.: US 9,173,430 B1
(45) Date of Patent: Nov. 3, 2015

(54) CARBONATING BEVERAGES AND CHECK VALVE USEFUL THEREIN

(71) Applicant: Michael Lee Harvell, High Point, NC (US)

(72) Inventor: Michael Lee Harvell, High Point, NC (US)

( * ) Notice: Subject to any disclaimer, the term of this patent is extended or adjusted under 35 U.S.C. 154(b) by 326 days.

(21) Appl. No.: 13/887,637

(22) Filed: May 6, 2013

(51) Int. Cl.
    *B01F 3/04*     (2006.01)
    *A23L 2/54*     (2006.01)
    *F16K 15/14*     (2006.01)

(52) U.S. Cl.
    CPC .. *A23L 2/54* (2013.01); *F16K 15/14* (2013.01)

(58) Field of Classification Search
    CPC ......... A23L 2/00; A23L 2/54; B01F 3/04801; B01F 15/0205; B01F 15/0212; B01F 15/0213; F16K 15/14
    USPC .............................. 261/64.1, 64.3, 74, DIG. 7
    See application file for complete search history.

(56) References Cited

U.S. PATENT DOCUMENTS

| | | | | |
|---|---|---|---|---|
| 1,546,510 | A | * | 7/1925 | Possner .......................... 261/64.1 |
| 2,921,711 | A | * | 1/1960 | Mack ................................ 222/5 |
| 4,737,320 | A | * | 4/1988 | Rothschild .................... 261/64.3 |
| 4,823,969 | A | | 4/1989 | Caldwell ........................ 215/260 |
| 4,838,324 | A | | 6/1989 | Boyd .............................. 141/64 |
| 5,282,495 | A | | 2/1994 | Chamberlain .................... 152/4 |
| 5,586,588 | A | | 12/1996 | Knox ............................. 141/285 |
| 5,792,391 | A | | 8/1998 | Vogel et al. ................. 261/121.2 |
| 5,921,418 | A | | 7/1999 | Pugh ............................. 215/247 |
| 8,191,734 | B2 | | 6/2012 | Lupfer .............................. 222/5 |
| 8,323,713 | B1 | | 12/2012 | Selman ......................... 426/477 |
| D708,708 | S | * | 7/2014 | Harvell ........................ D23/233 |
| 2006/0186076 | A1 | | 8/2006 | Shiloni .......................... 215/229 |
| 2010/0028515 | A1 | * | 2/2010 | Gormley ....................... 426/477 |

FOREIGN PATENT DOCUMENTS

EP      0258057 A2 * 3/1988

OTHER PUBLICATIONS

FizzGiz, carbonatedsodamaker.com, "At-Home Soda Maker Makes a Fun Gift" Oct. 18, 2011.
Vernay, vernay.com/Markets/Specialty-Consumer/Product-Categories Combination Valves; copyright 2013.

* cited by examiner

*Primary Examiner* — Charles Bushey
(74) *Attorney, Agent, or Firm* — MacCord Mason PLLC

(57) ABSTRACT

A mechanism for carbonating a liquid in a bottle that has a neck with outer threads includes a source of pressurized carbon dioxide, a dispenser to controllably release the carbon dioxide through an orifice in a pointed component. A bottle cap has a thickness and has a hole in it. A check valve installed in the hole includes an elastomeric plug having a high pressure side and a low pressure side joined by a stem. A passageway open at the low pressure side extends through the low pressure side, the stem and into the high pressure side, terminating within a shank in the high pressure side and defines a shank sidewall laterally of the passageway. At least one puncture is made through the shank sidewall to the passageway.

14 Claims, 8 Drawing Sheets

CARBONATING BEVERAGES AND CHECK VALVE USEFUL THEREIN

BACKGROUND OF THE INVENTION

Carbonated beverages are commonly stored and transported in bottles, and modern plastic bottles with modern plastic caps have proven quite reliable at holding the carbonation in contained beverages. The caps have internal threads that engage external threads on necks of the bottle. The two are manufactured with close enough tolerances, so that when the cap is tightened on the neck, an air-tight seal is made between the cap and the bottle in a highly reliable fashion, holding in the elevated pressure caused by carbonation of the beverage.

Carbonating beverages by the consumer has become a popular activity, largely to save the cost of pre-carbonated beverages. Home carbonation can also be used to restore drinks that have "gone flat." There are known kits that can be purchased to carbonate at home, but these have proven to be expensive in their own right.

One way to carry this out has been done for several years commercially. A persistent problem with the known technologies has been associated with the check valve needed to allow the insertion of high pressure carbon dioxide and its retention in the pressurized bottle. Problems have arisen in connections between the valve and the bottle cap as well as in the body of the valve itself. In addition, other attempts to find ways to find home carbonation tools have proven to be unreliable and costly.

SUMMARY OF THE INVENTION

The present invention fulfills one or more of these needs in the art by providing a check valve for installation in a hole in a body having a defined thickness. An elastomeric plug has a high pressure side and a low pressure side joined by a stem, and a passageway open at the low pressure side extends through the low pressure side, through the stem and into the high pressure side, terminating within a shank in the high pressure side and defines a shank sidewall laterally of the passageway. At least one puncture is made through the shank sidewall to the passageway. The plug is installed with the stem in the hole of the body and the low pressure side on one side of the hole and the high pressure side on an opposite side of the hole. A high pressure source can be introduced into the passageway from the low pressure side, so high pressure fluid can be released into the passageway from the high pressure source. This causes passageway distention and enlarges the puncture to allow high pressure fluid to flow through the puncture. When the high pressure source is removed, the passageway returns to an undistended shape, closing the puncture and preventing flow of pressurized fluid from the high pressure side to the low pressure side.

The low pressure side may be shaped like a mushroom cap attached to the stem. The low pressure side may have an outer flange and the high pressure side may have an inner flange, with the inner and outer flanges separated by a distance smaller than the thickness of the body having the hole, so that the stem between the inner and outer flanges remains in a state of tension when installed, facilitating the integrity of the seal between the plug and the body. The stem may be curved as it joins the inner and outer flanges. The stem may have a relaxed diameter greater than the diameter of the hole in the body so that the stem between the inner and outer flanges remains in a state of transverse compression in the hole when installed, facilitating the integrity of the seal between the plug and the body.

The punctures may be narrow slits in the sidewall of the shank aligned with the passageway, allowing the narrow slits to open up as the high pressure side is distended, lowering resistance to flow when dispensing pressurized liquids or gasses through the valve.

There may be at least two slits opposed to one another across the passageway.

The plug may have a circular cross section.

The shank of the high pressure side preferably extends below the passageway's termination sufficiently far to form a handle to allow pulling of the plug through the hole in the body. For example, the shank in the high pressure side extends below the passageway's termination at least twice as far as the passageway extends into the high pressure side to form a handle to allow the plug to be pulled through the hole in the body.

The elastomer of the plug preferably has a hardness on the Shore A scale of 43 (ten seconds on the ASTM D2240 test) and ultimate tensile strength in the range from 750 to 800 psi.

The invention can also be considered as a kit for carbonating a liquid in a bottle that has a neck with outer threads. The kit may include a source of pressurized carbon dioxide, a dispenser to release carbon dioxide from the source of pressurized carbon dioxide in a controlled fashion through an orifice in a pointed component of the dispenser, and a bottle cap having a round cap end and a peripheral skirt that has internal threads to match the outer threads on the bottle neck and a check valve in the bottle cap, as described.

The invention can also be considered as a method of assembling a fitting for carbonating a beverage including forming a hole in a bottle cap for a bottle to hold the beverage to be carbonated, inserting an elongated shank of a high pressure side of an elastomeric plug that has a low pressure side connected to the high pressure side by a stem and a passageway open at the low pressure side and extending through the low pressure side, through the stem and into the high pressure side, terminating within the shank in the high pressure side and within a shank sidewall, and at least one puncture through the shank sidewall to the passageway, and pulling the shank through the hole, thereby causing the plug to elongate and thin under tension so that the flange of the high pressure side passes through the hole until the stem is resident in the hole.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
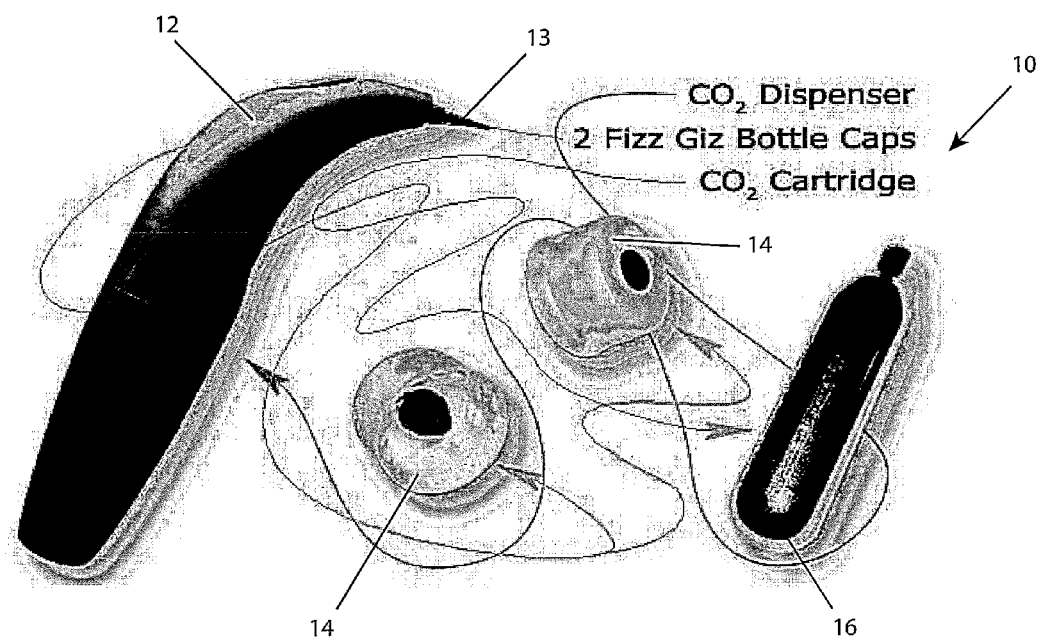
FIG. 1 is a view of components useful for carbonating a beverage in a bottle.
Figure 2:
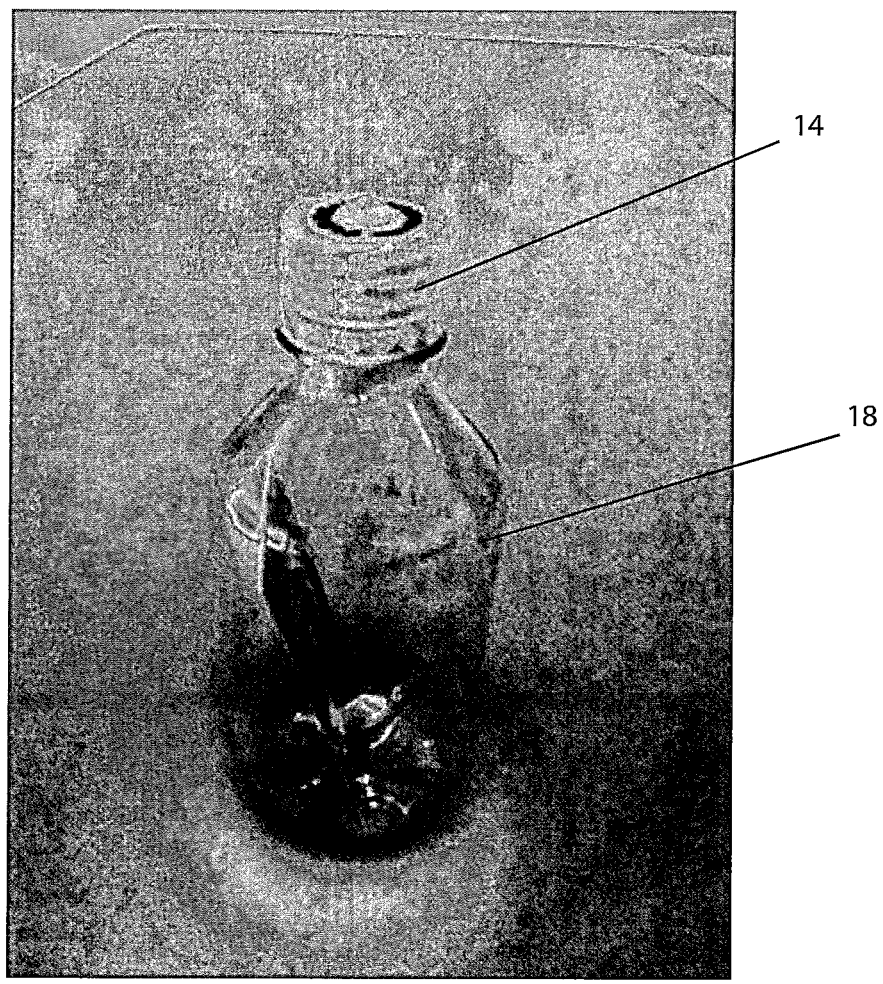
FIG. 2 is a perspective view of a bottle in accordance with the invention.
Figure 3:
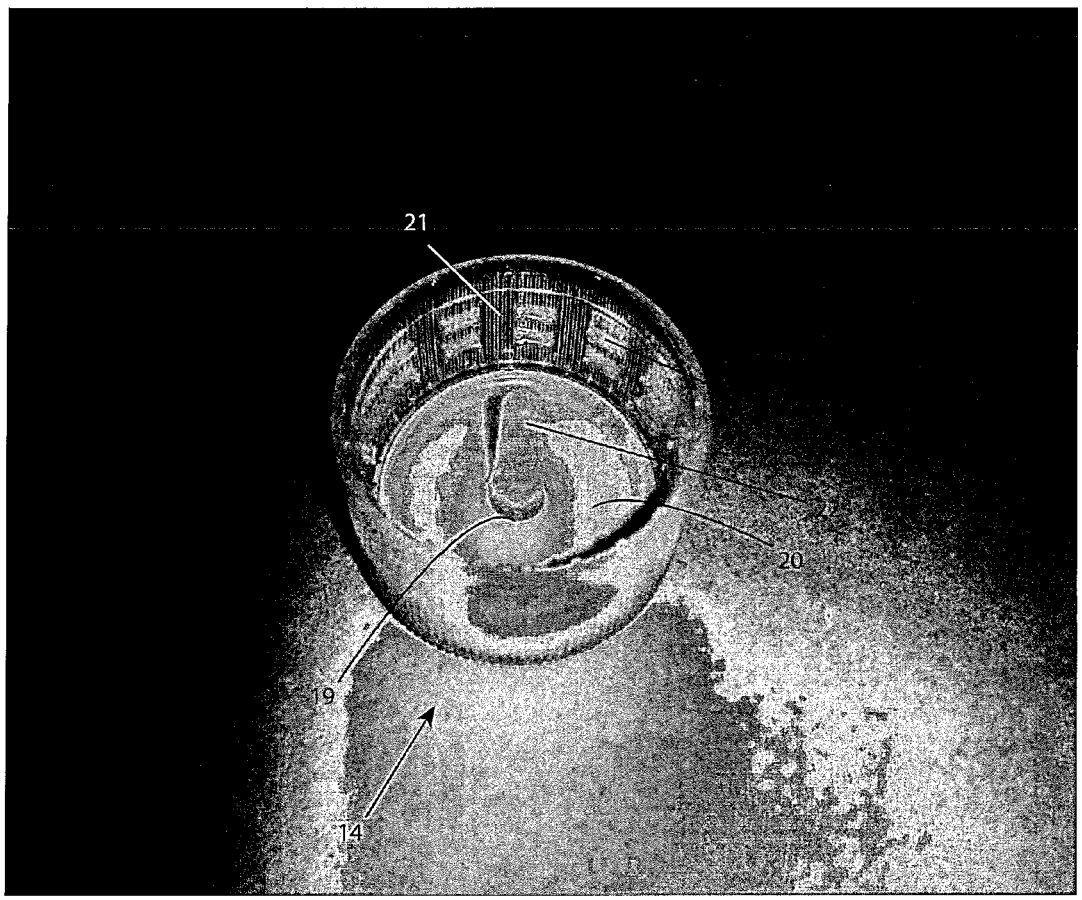
FIG. 3 is a perspective view of the bottle cap on the bottle shown in FIG. 1.

As seen in FIG. 1, a kit of materials 10 can be provided to allow a customer to carbonate his or her own beverages at home. The kit includes a carbon dioxide cartridge 16 of conventional design as well as a carbon dioxide dispenser 12 of conventional design. The cartridge 16 fits within the dispenser 12. The dispenser releases carbon dioxide through a regulator (to adjust the pressure) out through a hole in a nozzle 13. Also included in kit 10 is one or more caps 14 equipped with a check valve. The cap 14 with its check valve can be seen in FIG. 2 mounted on a bottle 18 of conventional design. The cap 14 can be a conventional bottle cap available commercially, that has been modified by having a hole made in it to receive the check valve 22, seen more clearly in FIG. 3. As seen in FIG. 3 the cap 14 has an inner face 20 and a peripheral depending skirt 21. The skirt 21 has inwardly formed threads 23 in conventional fashion. A hole 19 in the inner face 20 is formed by boring, punching, drilling or the like. As seen in FIG. 3 the check valve 22 has been positioned within the hole 19.

Figure 4:
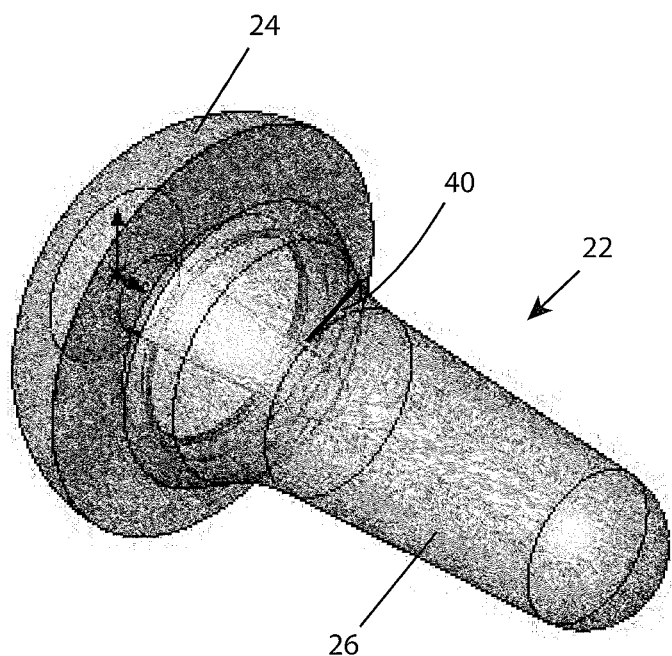
FIG. 4 is a perspective view of a plug valve useable in the bottle cap.
Figure 8:
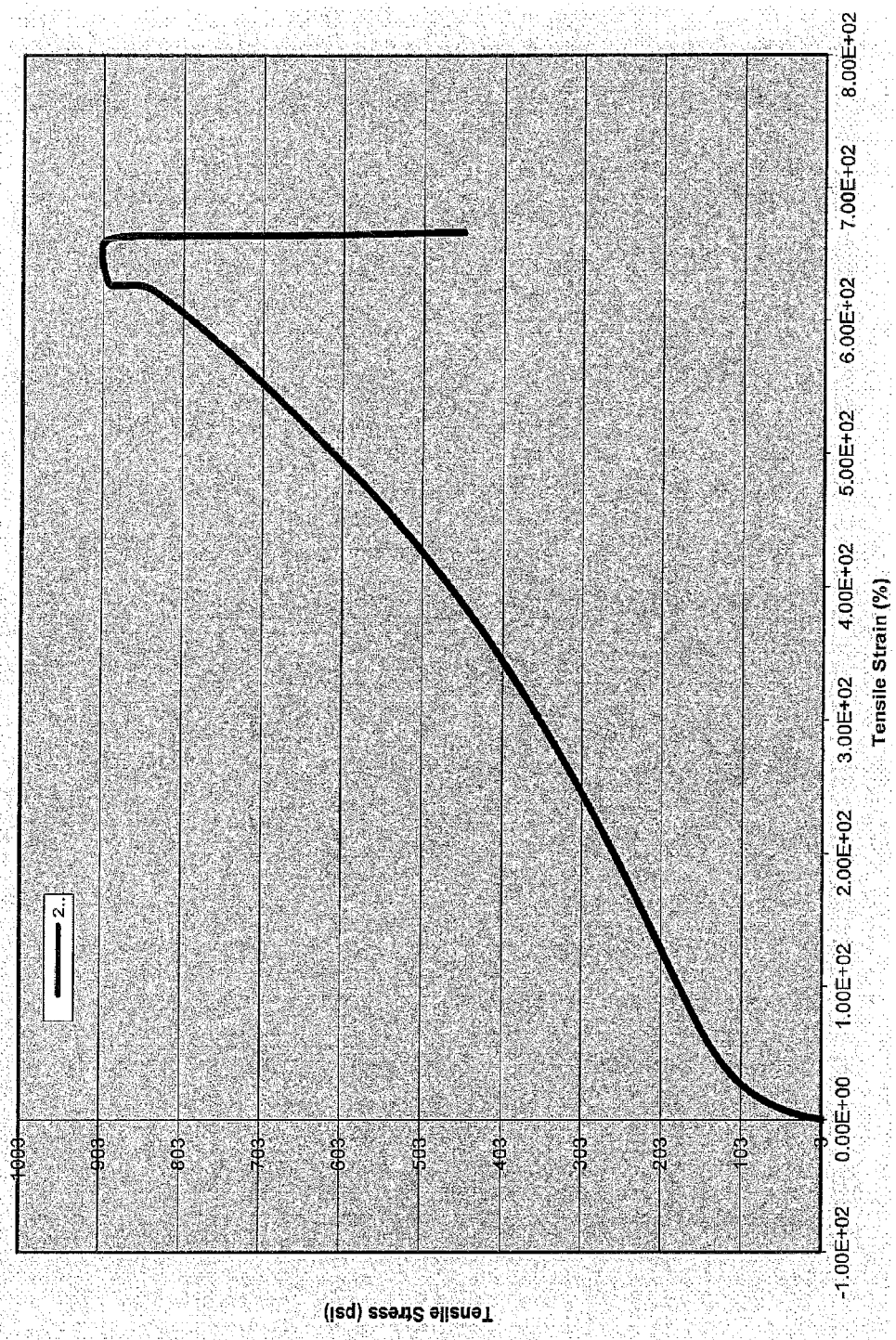
FIG. 8 is a stress-strain diagram of a preferred material for the check valve.

The check valve 22 is seen alone in perspective view in FIG. 4. The portion that will be positioned on the top of the cap 14 (referred to as the low pressure side 24) is shown joined to the high pressure side 26 in the form of a shank that extends into the bottle under the cap. Since it will be exposed to the elevated pressure of the headspace above the carbonated beverage, it will be exposed to a higher pressure than the low pressure side 24. The high pressure side 26 and low pressure side 24 are connected by a stem 34 so that all of the parts are integrally formed and unitary. Together they form a plug which can be injection molded from a suitable elastomer. The elastomer of the plug preferably has a hardness on the Shore A scale of 43 (ten seconds on the ASTM D2240 test) and ultimate tensile strength in the range from 750 to 800 psi. It preferably has a durometer of 40 to 46. A stress/strain diagram of the preferred material is included as FIG. 8. A preferred material for the plug can be Dynaflex elastomer from GLS Thermoplastic Elastomers, PolyOne Corporation, 833 Ridgeview Drive, McHenry, Ill. 60050 USA. The elastomer's characteristics include soft, flexible feel, excellent grip characteristics, good weatherability, easy processability and colorability. The material is preferably food grade if it is to come into contact with beverages.

Figure 6:
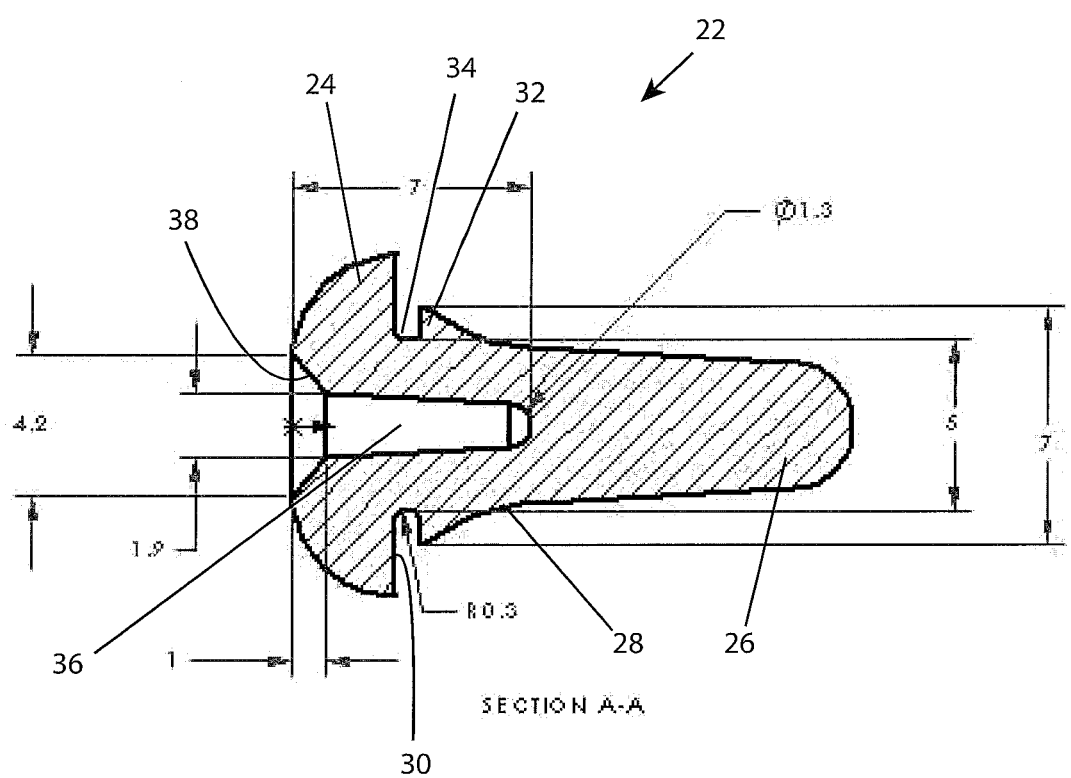
FIG. 6 is a sectional view of the embodiment of FIG. 5 taken along lines A-A and looking in the direction of the arrows.

As seen in sectional view in FIG. 6, the low pressure side 24 has a passageway 36 in it that extends downwardly down through a stem 34 into the shank of the high pressure side 26. Radially outward of the passageway the shank is merely an annular sidewall. However, as seen in FIG. 6, a considerable amount of shank continues beyond the end of the passageway. This helps form an insertion tool and handle, discussed below. The upper end of the passageway 36 at the top of the low pressure side 24 is beveled outwardly as at 38 to provide a wider conical approach to the central passageway 36. The bottom of the low pressure side forms a relatively flat flange 30.

The high pressure side 26 is provided with a flange 32 that extends away from the low pressure side in an inward taper 28 down through much of the body of the high pressure side 26. The spacing between the flange 30 and flange 32, or the length of the neck 34 is selected to be thinner than the thickness of the cap 20 in which it will mount. While the distance could be the same as the cap thickness 20, making it larger would risk causing leakage.

As seen in FIG. 4 a puncture or slit 40 is formed in the high pressure side 26 radially inward to the passageway 36. This slit is formed in the portion of the shank defined by the sidewall.

Assembly of the check valve 22 into the cap 14 is easy and straight forward. The end of the shank of the high pressure side 26 is inserted through the hole 19 and can be grasped and pulled from the bottom of the cap. The tapering shank forms an insertion tool to help aim the shank through the hole in the cap and further serves as a handle that can be grasped by hand or by a mechanical device to pull the high pressure side of the plug through the hole. As the taper 28 of the high pressure side bears against the top of the cap, the elastomer of the valve plug flexes inwardly, aided by the existence of the central passageway 36. The elastomer surrounding the passageway can collapse into the passageway, reducing the cross sectional area of the shank until the shoulder of the flange 32 clears the bottom of the hole 19 of the cap. The puncture or slit 40 is then positioned on the high pressure side of the cap 14.

Figure 7:
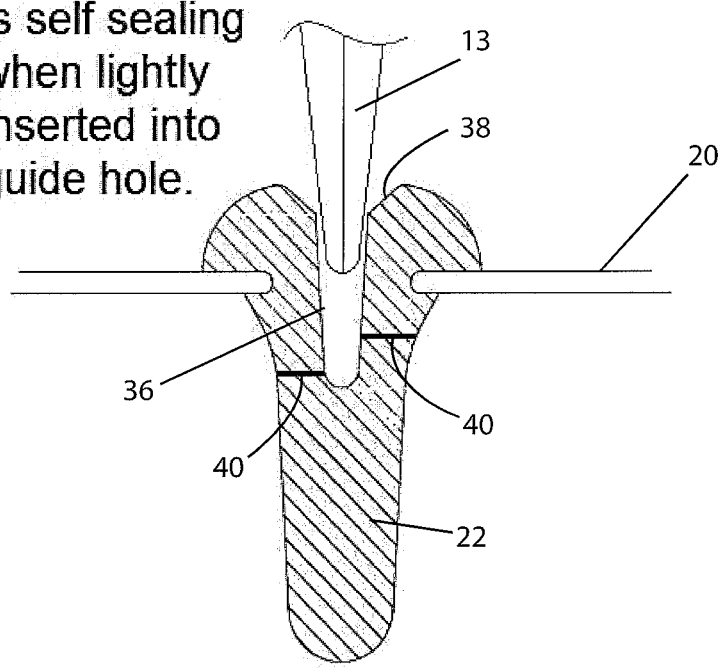
FIG. 7 is a schematic view of the way the $CO_2$ dispenser fits with the check valve.

Once the check valve is installed in the cap, the cap can be applied to the bottle 18 and the carbon dioxide dispenser can be equipped with its carbon dioxide cartridge and brought into contact with the passageway 36. The nozzle tip 13 of the dispenser 12 self-seals when lightly inserted into the passageway 36, as seen in FIG. 7. The conical dispenser nozzle sits smartly on the low pressure side of the valve, since the terminal part of the passageway 36 is beveled. The entrance to the passageway 36 opens up to a larger diameter on top of the head of the valve, making it easier for the user to align the nozzle tip with the passageway. The larger open top is conical, guiding the tip to the smaller hole of the passageway during insertion.

As carbon dioxide is released from the tip 13, the volume of the passageway 36 balloons outwardly or becomes distended, forcing open the slit or puncture 40, and allowing the carbon dioxide to flow through the puncture 40 into the bottle under the bottle cap. This continues as along as the dispenser 13 is releasing pressurized carbon dioxide and the pressure in the bottle has not yet reached the release pressure. Upon removal of that pressure, the check valve immediately returns to its original shape, closing the puncture 40 and preventing the backflow of carbon dioxide that has been introduced into the bottle or other pressure vessel.

Figure 5:
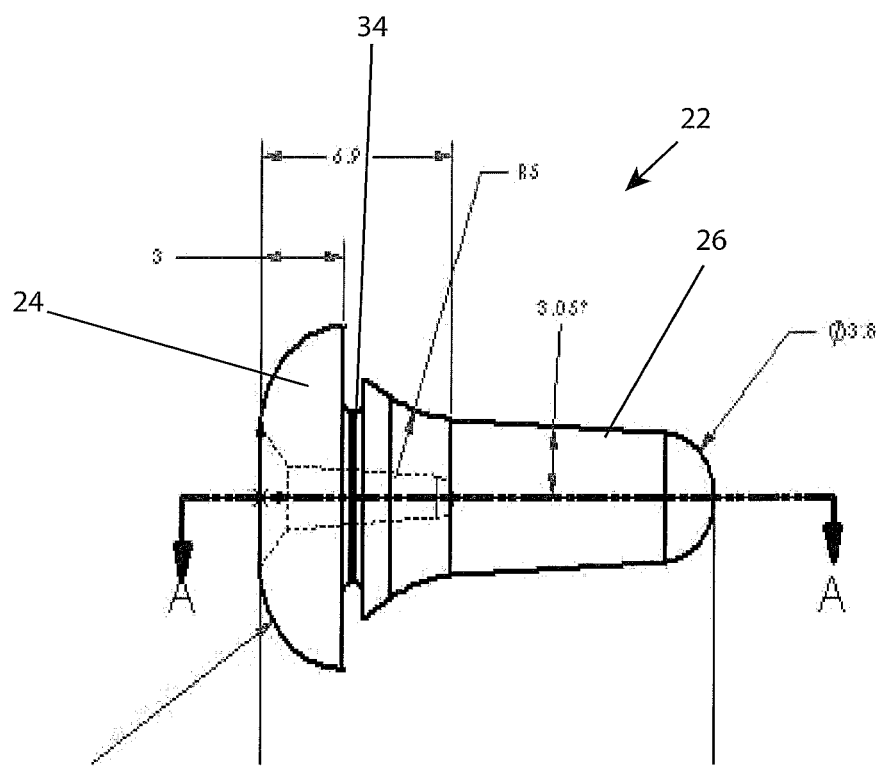
FIG. 5 is an elevational view of the plug valve of FIG. 3.

As seen in FIG. 5 the stem 34 is radiused or curved, to cause tension when the inside face of the cap's hole bears against it. Rather than being purely cylindrical, the radius shape causes the stem to flare out where it meets the low pressure side 24 and high pressure side 26. This results in a tighter seal between the hole in the cap and the valve than if the stem was cylindrical, i.e. squared off at each flange. Also the generally right angled corners of the material of the body in which the hole is formed dig into to the rounded stem material, adding to the seal.

Two factors provide the sealing effect: (i) the tightness with which the elastomer fills the hole in the wall of the pressure vessel and (ii) the snugness with which the inner flange seated on and pulled against the inner face of the bottle wall. The tightness in case (i) is achieved by installing a "fatter" plug stem into a "skinnier" hole. The fatter the plug stem and the skinnier the hole, the higher the effectiveness of the seal. The tightness in case (ii) is achieved by stretching the plug stem in its longitudinal direction, pulling its inner and outer flanges further apart than in their relaxed, unstressed state. The tension in the stem of the plug pulls the flange 32 of the high pressure side tightly against the face of the inner wall of the bottle cap or other pressure vessel in which it may be installed. It is beneficial for the distance between the flange faces at the top and bottom of the stem to be a smaller distance than the vessel wall into which it is installed. This relaxed distance can vary from one application to the next, dependent upon the thickness of the wall in which the plug valve is being installed.

A monolithic die cast plug valve of an elastomer having suitable modulus of elasticity and ultimate tensile strength properties so as to allow the plug valve to stretch under tension without snapping and to become smaller in dimensions orthogonal to the long axis of the valve, making it possible to install it into holes smaller than the valve's normal unaltered dimensions in its undistorted state, thereby facilitating ease of installation into a properly sized mounting hole and facilitating the integrity of the seal between the inside edges of the hole in the wall of the pressure vessel and the plug of the plug valve between its inner and outer flanges.

The sideways puncture to the passageway in the check valve does not have to be perfectly radial, but could be a chord angled from the outer circumference. The punctures do not have to be perfectly horizontal, rather they can be at an acute angle from above or below. Perfectly horizontal, radial punctures provide more predictable performance, but others are usable. There may be more than one puncture. Increasing the number of punctures lowers the threshold pressure required to penetrate the valve. While the puncture can be round like a pinprick, the preferred shape is a slit having some width, which is preferably aligned with the passageway in the shank. That causes the radial compression of the sidewall to force the slit closed when the high pressure is being maintained, such as in a bottle of carbonated beverage, with the carbonated head space on the high pressure side and atmospheric pressure on the low pressure side.

A certain "cracking pressure" (or threshold pressure) must be applied to the high pressure side of the valve before it will open and allow fluid/gas flow through the valve. The sidewall of the shank forms a circular arch. When exposed to a higher pressure inside the bottle, the force vectors inside the bottle act upon the arch and are converted into compressive force vectors inside the material of the sidewall—running parallel with every tangent on the circle (an infinite number). None of the force vectors are converted into tensile force vectors. Without tension, the slits remain closed. Until that circular arch is stretched outward by pressure introduced into the passageway, such as by the application of pressurized $CO_2$ from the nozzle 13, the slit does not open. The tiniest amount of compression (from pressure on the outside of the sidewall) forces the narrow slit more tightly closed. Therefore, preferably, the punctures are slits aligned generally parallel with the passageway, so the forces act to press the opposing faces of the slit together.

The solid tip of the shank of the check valve plug below the passageway can be shortened or lengthened, if necessary, to protrude through deeper holes. The added length shown is of benefit when installing the valve in the cap, to provide a grip site; once installed, it does not affect the valve's function.

The hole in the cap and/or the valve plug may be shapes other than circular in cross section (such as elliptical, octagonal, hexagonal, pentagonal, square, triangular) and still fall within the scope of the invention. In doing so, the valve plug would need to be made in a conforming shape and perhaps of a more pliable material to conform to the hole as installed and provide a closure for the hole to assure pressure retention.

The check valve described herein is inexpensive and easy to install and provides a superior seal. The valve can be considered and accurately referred to as a normally closed valve. Some of duckbill valves allow reverse flow at lower pressures and require a threshold pressure buildup to maintain a reliable seal at lower pressure. Preferred embodiments of the valve of this application function as reliable normally closed check valve even at small negative pressure differentials.

The valve advantageously prevents full penetration of a dispenser tip into the bottle. Football inflation needles and duckbill check valves normally allow the nozzle of the $CO_2$ source to fully penetrate the valve to the bottle contents beyond the valve. This is potentially unsanitary. The contents inside the bottle could transfer onto the nozzle/tip and serve to promote bacterial growth on the nozzle 13. And, foreign substances on the outside surface of the nozzle/tip 13 could be introduced to the contents inside the bottle.

As used herein, the terms "high pressure side," "low pressure side" and the like are to be interpreted as if the low pressure is ambient atmospheric pressure, including normally lowered pressures at higher elevations. To the extent the apparatus is used in differing ambient pressure environs, suitable nomenclature adaptations are intended.

While the primary usefulness described has been in bottle caps to aid in carbonation of beverages in bottles closed by caps, the check valve can be employed in numerous other suitable situations, with other types of pressure vessels or bodies.

Certain other modifications and improvements will occur to those skilled in the art upon reading the foregoing description. It should be understood that all such modifications and improvements have been omitted for the sake of conciseness and readability, but are properly within the scope of the following claims.

What is claimed is:

1. A check valve for installation in a hole in a body having a defined thickness comprising
    an elastomeric plug having a high pressure side and a low pressure side joined by a stem,
    a passageway open at the low pressure side and extending through the low pressure side, through the stem and into the high pressure side, terminating within a shank in the high pressure side and defining a shank sidewall laterally of the passageway, and
    at least one puncture through the shank sidewall to the passageway,
    whereby when the plug is installed with the stem in the hole of the body and the low pressure side on one side of the hole and the high pressure side on an opposite side of the hole, a high pressure source can be introduced into the passageway from the low pressure side, high pressure fluid can be released into the passageway from the high pressure source, causing passageway distention and enlarging the puncture to allow high pressure fluid to flow through the puncture, and when the high pressure source is removed, the passageway returns to an undistended shape, closing the puncture and preventing flow of pressurized fluid from the high pressure side to the low pressure side.

2. A check valve as claimed in claim 1 wherein the low pressure side is shaped like a mushroom cap attached to the stem.

3. A check valve as claimed in claim 1 wherein the low pressure side has an outer flange and the high pressure side has an inner flange and the inner and outer flanges are separated by a distance smaller than the thickness of the body having the hole so that the stem between the inner and outer flanges remains in a state of tension in the direction parallel with the passageway when installed, pulling the inner and outer flanges into contact with the body, facilitating the integrity of the seal between the plug and the body.

4. A check valve as claimed in claim 1 wherein the low pressure side has an outer flange and the high pressure side has an inner flange and the inner and outer flanges are separated by the stem, the stem having a relaxed diameter greater than the diameter of the hole in the body so that the stem between the inner and outer flanges remains in a state of transverse compression in the hole when installed, facilitating the integrity of the seal between the plug and the body.

5. A check valve as claimed in claim 1 wherein the punctures are narrow slits in the sidewall of the shank and aligned to the passageway, allowing the narrow slits to open up as the high pressure side is distended, lowering resistance to flow when dispensing pressurized liquids or gasses through the valve.

6. A check valve as claimed in claim 5 wherein there are at least two slits opposed to one another across the passageway.

7. A check valve as claimed in claim 1 wherein the low pressure side forms an outer flange and the high pressure side forms an inner flange and the inner and outer flanges are joined by the stem, the stem being curved as it joins the inner and outer flanges.

8. A check valve as claimed in claim 1 wherein the plug has a circular cross section.

9. A check valve as claimed in claim 1 wherein the shank of the high pressure side extends below the passageway's termination sufficiently far to form a handle to allow pulling of the plug through the hole in the body.

10. A check valve as claimed in claim 1 wherein the shank in the high pressure side extends below the passageway's termination at least twice as far as the passageway extends into the high pressure side to form a handle to allow the plug to be pulled through the hole in the body.

11. A check valve as claimed in claim 1 wherein the elastomer of the plug has a hardness on the Shore A scale of 43 (ten seconds on the ASTM D2240 test) and ultimate tensile strength in the range from 750 to 800 psi.

12. A check valve as claimed in claim 1 wherein the stem of the plug remains in a state of tension when installed, causing a flange on the high pressure side to seat against, in contact with, and tightly sealed to the body surrounding the mounting hole.

13. A check valve for installation in a hole in a body having a defined thickness comprising
   an elastomeric plug having a high pressure side and a low pressure side joined by a stem having a length not greater than the defined thickness,
   the high pressure side having a flange connected to the stem and tapering away from the flange to an elongated shank having a bottom,
   a passageway open at the low pressure side and extending through plug, through the stem and into the high pressure side, terminating within the shank in the high pressure side and defining a shank sidewall, and
   at least one puncture through the shank sidewall to the passageway,
   so the elongated, tapered shank can be inserted at least partially through the hole in the body and the tapered shank can be pulled, causing the elastomeric plug to elongate and thin under tension so that the flange of the high pressure side can pass through the hole until the stem is resident in the hole with the low pressure side not passing through the hole, the flange of the high pressure side forming a seal to close the hole in the body,
   whereby a high pressure source can be introduced into the passageway, high pressure fluid can be released into the passageway, causing passageway distention and enlarging the puncture to allow high pressure fluid to flow through the puncture, and when the high pressure source is removed, the passageway returns to undistended shape, closing the puncture and preventing flow of pressurized fluid from the high pressure side to the low pressure side.

14. A mechanism for carbonating a liquid in a bottle that has a neck with outer threads comprising
   a source of pressurized carbon dioxide,
   a dispenser to release carbon dioxide from the source of pressurized carbon dioxide in a controlled fashion through an orifice in a pointed component of the dispenser,
   a bottle cap having a round cap end and a peripheral skirt that has internal threads to match the outer threads on the bottle neck, the round cap end having a thickness and having a hole in it, and
   a check valve installed in the hole in round end cap including an elastomeric plug having a high pressure side and a low pressure side joined by a stem,
   a passageway open at the low pressure side and extending through the low pressure side, through the stem and into the high pressure side, terminating within a shank in the high pressure side and defining a shank sidewall laterally of the passageway, and
   at least one puncture through the shank sidewall to the passageway,
   whereby when the plug is installed with the stem in the hole of the body and the low pressure side on one side of the hole and the high pressure side on an opposite side of the hole, a high pressure source can be introduced into the passageway from the low pressure side, high pressure fluid can be released into the passageway from the high pressure source, causing passageway distention and enlarging the puncture to allow high pressure fluid to flow through the puncture, and when the high pressure source is removed, the passageway returns to an undistended shape, closing the puncture and preventing flow of pressurized fluid from the high pressure side to the low pressure side.

\* \* \* \* \*